(12) United States Patent
Small et al.

(10) Patent No.: US 8,645,148 B2
(45) Date of Patent: Feb. 4, 2014

(54) METHODS AND APPARATUS PROVIDING AN E-ENABLED GROUND ARCHITECTURE

(75) Inventors: Gregory John Small, Federal Way, WA (US); Jayanth Mysore Srinivasamurthy, Bellevue, WA (US); Kim Van Wyck Gould, Seattle, WA (US); Lee S. Hall, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1545 days.

(21) Appl. No.: 11/617,903

(22) Filed: Dec. 29, 2006

(65) Prior Publication Data

US 2008/0162155 A1    Jul. 3, 2008

(51) Int. Cl.
*G06Q 10/00*    (2012.01)

(52) U.S. Cl.
USPC ........................................................ 705/1.1

(58) Field of Classification Search
USPC ..................................... 705/26.2, 1, 1.1, 321
See application file for complete search history.

(56) References Cited

U.S. PATENT DOCUMENTS

| | | | |
|---|---|---|---|
| 4,788,531 A | 11/1988 | Corwin et al. | |
| 5,761,625 A | 6/1998 | Honcik et al. | |
| 5,778,203 A | 7/1998 | Birkedahl et al. | |
| 6,047,165 A | 4/2000 | Wright et al. | |
| 6,133,846 A | 10/2000 | Birkedahl et al. | |
| 6,173,159 B1 | 1/2001 | Wright et al. | |
| 6,181,990 B1 | 1/2001 | Grabowsky et al. | |
| 6,246,320 B1* | 6/2001 | Monroe .......................... | 340/506 |
| 6,308,045 B1 | 10/2001 | Wright et al. | |
| 6,394,815 B1 | 5/2002 | Sarno et al. | |
| 6,496,568 B1* | 12/2002 | Nelson ........................ | 379/88.12 |
| 6,606,546 B2 | 8/2003 | Sinex | |
| 6,633,910 B1* | 10/2003 | Rajan et al. .................... | 709/224 |
| 6,757,712 B1* | 6/2004 | Bastian et al. ................ | 709/206 |
| 6,760,778 B1 | 7/2004 | Nelson et al. | |
| 6,795,758 B2 | 9/2004 | Sinex | |
| 6,801,769 B1 | 10/2004 | Royalty | |
| 6,826,461 B2 | 11/2004 | Sinex | |
| 6,876,905 B2 | 4/2005 | Farley et al. | |
| 6,898,492 B2 | 5/2005 | de Leon et al. | |
| 6,915,189 B2 | 7/2005 | Igloi et al. | |
| 7,020,708 B2 | 3/2006 | Nelson et al. | |
| 7,069,121 B1* | 6/2006 | Cummings et al. ............... | 701/3 |
| 7,162,427 B1* | 1/2007 | Myrick et al. ................. | 705/348 |
| 7,418,409 B1* | 8/2008 | Goel ................................ | 705/5 |
| 2002/0198747 A1* | 12/2002 | Boyer et al. ....................... | 705/5 |
| 2003/0003872 A1 | 1/2003 | Brinkley et al. | |

(Continued)

OTHER PUBLICATIONS

The World Airline Entertainment Association (WAEA), Introduction to IWG Documents, Aug. 2, 2001, 4 pgs, version 1.0, WAEA, Chicago, IL.

(Continued)

*Primary Examiner* — Jami A Plucinski
*Assistant Examiner* — Olukayode Alabi
(74) *Attorney, Agent, or Firm* — Armstrong Teasdale LLP

(57) ABSTRACT

A method for integrating airplane operation related services provided by ground-based systems is described. The method includes receiving information from a plurality of airplane service functions, the airplane service functions including airlines, airplanes, regulatory authorities, maintenance repair organizations, and aircraft manufacturers, the received information relating to airplane operation. The method further includes determining which of the received airplane operation information is applicable to each of the airplane service functions, and distributing the applicable airplane operation information to each of the airplane service functions.

8 Claims, 12 Drawing Sheets

(56) References Cited

U.S. PATENT DOCUMENTS

2003/0065428 A1* 4/2003 Mendelson et al. .............. 701/9
2003/0078962 A1* 4/2003 Fabbricatore et al. ........ 709/203
2004/0093397 A1* 5/2004 Chiroglazov et al. ......... 709/219
2004/0143470 A1* 7/2004 Myrick et al. .................... 705/7
2005/0060371 A1* 3/2005 Cohen et al. .................. 709/205
2006/0036479 A1* 2/2006 Whitmore ....................... 705/10
2007/0112576 A1* 5/2007 Avery et al. ...................... 705/1
2008/0086320 A1* 4/2008 Ballew et al. ..................... 705/1
2008/0162155 A1* 7/2008 Small et al. ....................... 705/1

OTHER PUBLICATIONS

The World Airline Entertainment Association (WAEA), White Paper: On-Board Infrastructure, Aug. 2, 2001, 18 pgs, version 1.0, WAEA, Chicago, IL.

* cited by examiner

FIG. 9     e-Enabled Ground Stand-Alone Service View

METHODS AND APPARATUS PROVIDING AN E-ENABLED GROUND ARCHITECTURE

BACKGROUND OF THE INVENTION

This invention relates generally to ground activities relating to the operation of aircraft, and more specifically, to methods and apparatus for e-Enabling a ground architecture to provide interconnection and data sharing among the numerous entities involved in aircraft ground operations.

There exists a wide variety of system solutions targeted to the entities that provide products and services related to aircraft ground operations. These entities are sometimes referred to herein as business domains. However, these business domains are not well integrated with each other or with, for example, the aircraft manufacturer systems. The current method of doing business, at least with respect to aircraft operations (i.e., airplanes, airports, airlines, maintenance and repair organizations, regulatory authorities, and aircraft manufacturers) is an ad-hoc assortment of proprietary systems and standalone solutions. While these standalone systems may do their designated function very well, an improvement would be an integration of these and other systems, such that their various parcels of information could be shared. An additional improvement would result in the interoperability of these systems throughout the various business domains. Such solutions would tend to provide cost-effectiveness and flexibility for airline operation and aircraft related industries.

BRIEF DESCRIPTION OF THE INVENTION

In one aspect, a method for integrating airplane operation related services provided by ground-based systems is provided. The method includes receiving information from a plurality of airplane service functions, determining which of the received airplane operation information is applicable to each of the airplane service functions, and distributing the applicable airplane operation information to each of the airplane service functions. The airplane service functions include airlines, airplanes, regulatory authorities, maintenance repair organizations, and aircraft manufacturers, and the received information relates to airplane operation.

In another aspect, an integration architecture is configured to integrate and control ground-based airplane operation related information. The architecture includes a plurality of computer systems communicatively coupled to one another, and an integration function. The computer systems are programmed to provide information relating to a plurality of airplane service functions including two or more of airlines, airplanes, regulatory authorities, maintenance repair organizations, and aircraft manufacturers. The integration function determines which of the provided information is applicable to each of the two or more airplane service functions. The integration function further distributes the applicable information to each of the applicable two or more airplane service functions.

DETAILED DESCRIPTION OF THE INVENTION

Figure 1:
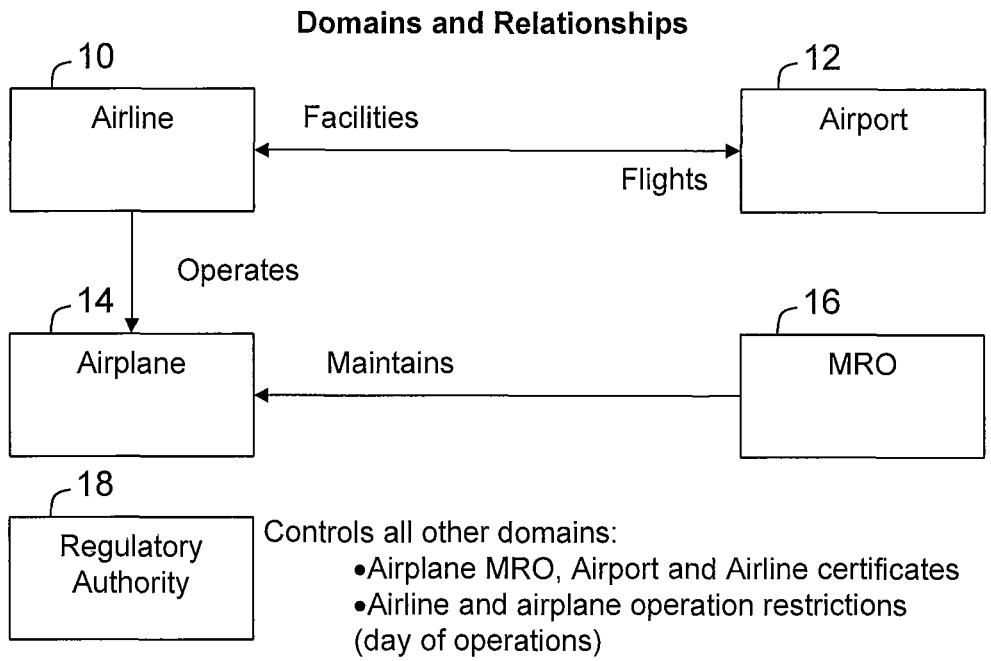
FIG. 1 is an illustration of the domains and relationships with regard to airport ground operations.

Described below, are various embodiments of ground-based networks and environments for the handling of information relating to aircraft when the aircraft are on the ground and in flight. Such embodiments include methods and apparatus that provide e-Enabled ground architecture solutions. Such solutions are related to information sharing between various entities involved, for example, in the handling of aircraft. E-Enabled as utilized herein, refers to the combining of multiple individual information sources, the delivery of electronic information using one or more of a communication backbone, network technology, and the storage and utilization of that electronic information to provide valuable user services. In one aspect, a ground architecture is defined by the business scope of a proposed e-Enabled aircraft information handling solution and may include one or more of an aircraft manufacturer, airlines, airports, maintenance, repair and overhaul (MRO) facilities, and regulatory authorities, which are collectively referred to herein as business domains.

There exists a wide variety of system solutions targeted to service these business domains, but they are not well integrated with one another or with, for example, aircraft manufacturer systems. As described herein, these existing system solutions may provide essential parts of an e-Enabled ground architecture solution and may further provide key interface points in order to contribute value to various e-Enabled ground architecture overall solutions. Such ground architecture solutions provide a framework for integrating these formerly standalone or partially integrated system solutions, allowing interoperation throughout the various business domains. Specifically, e-Enabled ground architecture solutions define product and service tailored options for interconnecting customer systems and/or supplier provided systems, to provide cost-effective information gathering and sharing solutions and flexibility for airline operation and aircraft related industries.

In one embodiment, the e-Enabled ground architecture is organized into different levels for visualization purposes. At the highest conceptual level, an operational view of the ground architecture outlines operational areas supported by the ground architecture. At the system level, a system view of the ground architecture provides logical business function support. A technical view of the ground architecture provides physical ground technology alternatives and implementation examples to accomplish the business function support.

The above mentioned business domains have a need for complete information sharing solutions that address the end-to-end scope of their business, rather than niche automation. Therefore, e-Enabled ground architecture configurations provide end-to-end solutions for actual and predicted customer needs. It is understood that different customers have different needs in terms of solution definition and constraints (e.g. whether the solution is provided by products and/or services). Therefore, an e-Enabled ground architecture identifies tailored options and reusable components that will help meet anticipated sets of customer needs.

It is further understood that customer needs change over time, based on, for example, perception of external threats to a business and business opportunities, as well as internal strengths and weaknesses of a business. To meet these changing needs, the e-Enabled ground architecture also provides scalable and open-ended designs to allow customers to benefit from additional e-Enabled capabilities. Such designs are maintainable over their lifespan so that market demands can be nimbly adapted to. Therefore, specific e-Enabled ground architectures are configured to be robust and reliable in a global environment, accommodating an increasing number of customers efficiently by minimizing adoption costs, while providing a scalable and open-ended design.

In an airline environment, the e-Enabled ground architecture is a set of design solutions to address business needs, which span business domains, that include, but are not limited to, airlines, airports, maintenance, repair and overhaul (MRO) companies, engine original equipment manufacturers (OEMs), aviation regulatory authorities, and aircraft manufacturers. As inferred above, these are referred to collectively herein as customers, or as business domains. The e-Enabled ground architecture defines a solution set that spans these business domains while taking advantage of various characteristics that are afforded by an e-Enabled system.

Figure 2:
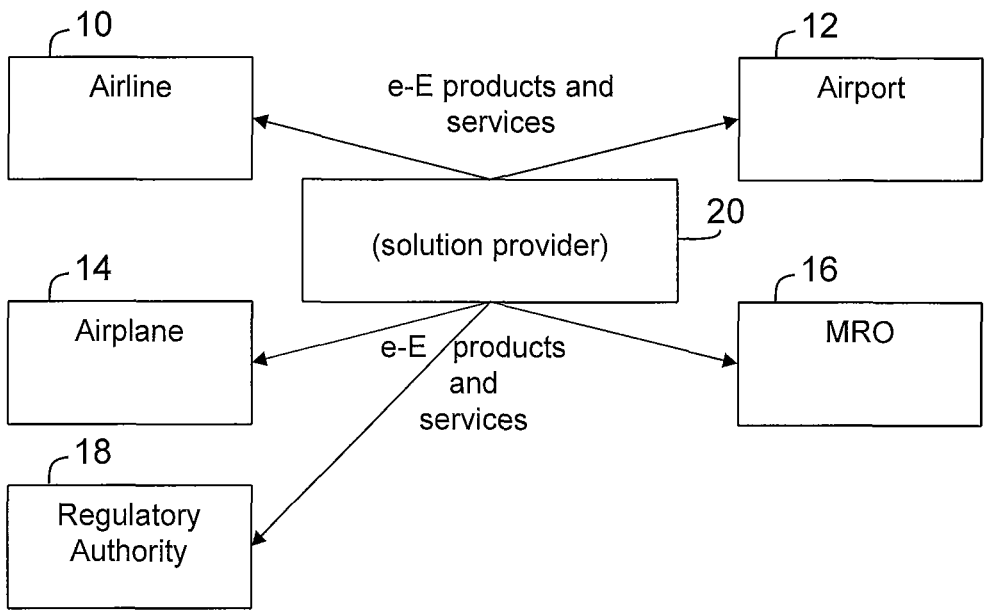
FIG. 2 is an illustration of the relationships a solutions provider has with the domains illustrated in FIG. 1.

FIG. 1 is an illustration of the domains and relationships with regard to airport ground operations. An airline 10 provides an airport 12 with flights to service (e.g., airplanes requiring services including maintenance, takeoffs and landings), and the airport 12 provides facilities for the use of airline 10. The airline 10 operates an airplane 14 and a maintenance, repair and overhaul (MRO) company 16 maintains the airplane 14. A regulatory authority 18 has an amount of control over the other domains. FIG. 2 is an illustration of the relationships a solutions provider 20, such as an aircraft manufacturer, has with the domains illustrated in FIG. 1.

A ground architecture technical view provides a level of detail that represents the lowest level (highest detail) of e-Enabled ground solution design definition. As described herein, the ground technical view provides product and services deployment options, and specific common services and definitions, for ground systems and ground integration. As a result, one embodiment of the ground-based systems portion of the e-Enabled ground technical architecture view consists of functional components and common services.

For example, functional components include e-Enabled (supplier provided) systems, supplier integration services, firewalls, customer systems, and customer integrations. Integration patterns identify how these components are utilized to enable e-Enabled supplier provided systems to interoperate with each other and with customer systems. Supplier provided systems include the e-Enabled systems (either at the supplier as a service or at the customer as a product), firewalls, (again either at the supplier as a service or at the customer as a product), and customer systems (e.g. reservations, fueling, etc.), which are essential components to e-Enabled solutions and if they fail, the failure must not propagate to e-Enabled systems or services.

These integration patterns can be combined in different ways to satisfy different customer business needs. For example, a customer application-to-application ("A2A") integration component can be accomplished at customer systems with an integration to a customer integration, or as a product model. In such a product model embodiment, supplier e-Enabled systems are deployed at the customer site, integrated together, and then the e-Enabled systems are integrated with a customer integration service. The customer integration service then integrates the systems with the supplier e-Enabled integration function.

In a product and service model embodiment, supplier e-Enabled systems are deployed at the customer site and within the supplier, and integrated together. Specifically, e-Enabled systems integrated with a customer integration service, and the supplier integration services at the customer and within the supplier facilities are integrated to enable interoperability between systems at the supplier of e-Enable services and at the customer. The customer integration service integrates the systems with the supplier e-Enabled integration function.

In an embodiment, at the facilities of the customer, with integrated systems, and as a product model, supplier e-Enabled systems are deployed at the customer site, integrated together for example, integrated with each customer system using the supplier's e-Enabled integration function. In a product and service model embodiment, supplier e-Enabled systems are deployed at the customer site and within the supplier facilities, integrated together, for example, e-Enabled systems integrated with the supplier's integration service. More specifically, the supplier's integration services at the customer and within the supplier, for example, an airframe manufacturer, are integrated to enable interoperability between systems at the airframe manufacturer and at their customer. The supplier integration service also integrates the customer systems with the supplier e-Enabled integration function.

A business-to-business ("B2B") integration component can also be provided as described with respect to the following integration patterns. For example, for a customer with a simple integration, as a service model, supplier e-Enabled systems are hosted at the supplier facilities, integrated together, for example, with customer systems that are accessible by customer users through the Internet. The customer systems interoperate with e-Enabled systems by sharing information and are operationally decoupled through the use of a shared file structure through which each system can asynchronously read and write data files.

For a customer with Simple Message Manager, the supplier e-Enabled systems are hosted at the supplier facilities, integrated together, for example, with customer systems, accessible by customer users through the Internet. The customer systems interoperate by sharing information and are operationally decoupled through the use of an integration appliance that stores and forwards messages with minimal translation between e-Enabled and customer systems.

For a Customer Direct Integration, as a service model, supplier e-Enabled systems are hosted at the supplier, integrated with customer systems which are accessible by customer users through the Internet. These customer systems are integrated with e-Enabled systems using the supplier integration service, for example, located within the supplier facilities.

For a customer with an integrated service, as a service model, supplier e-Enabled systems are hosted at the supplier and integrated together with the customer services, and are accessible by customer users through the Internet. For example, the customer integration service integrates the systems with the supplier e-Enabled integration function. More specifically, the supplier integration function within the supplier is integrated with the customer's integration function to enable interoperability between systems at the supplier and at the customer.

Figure 3:
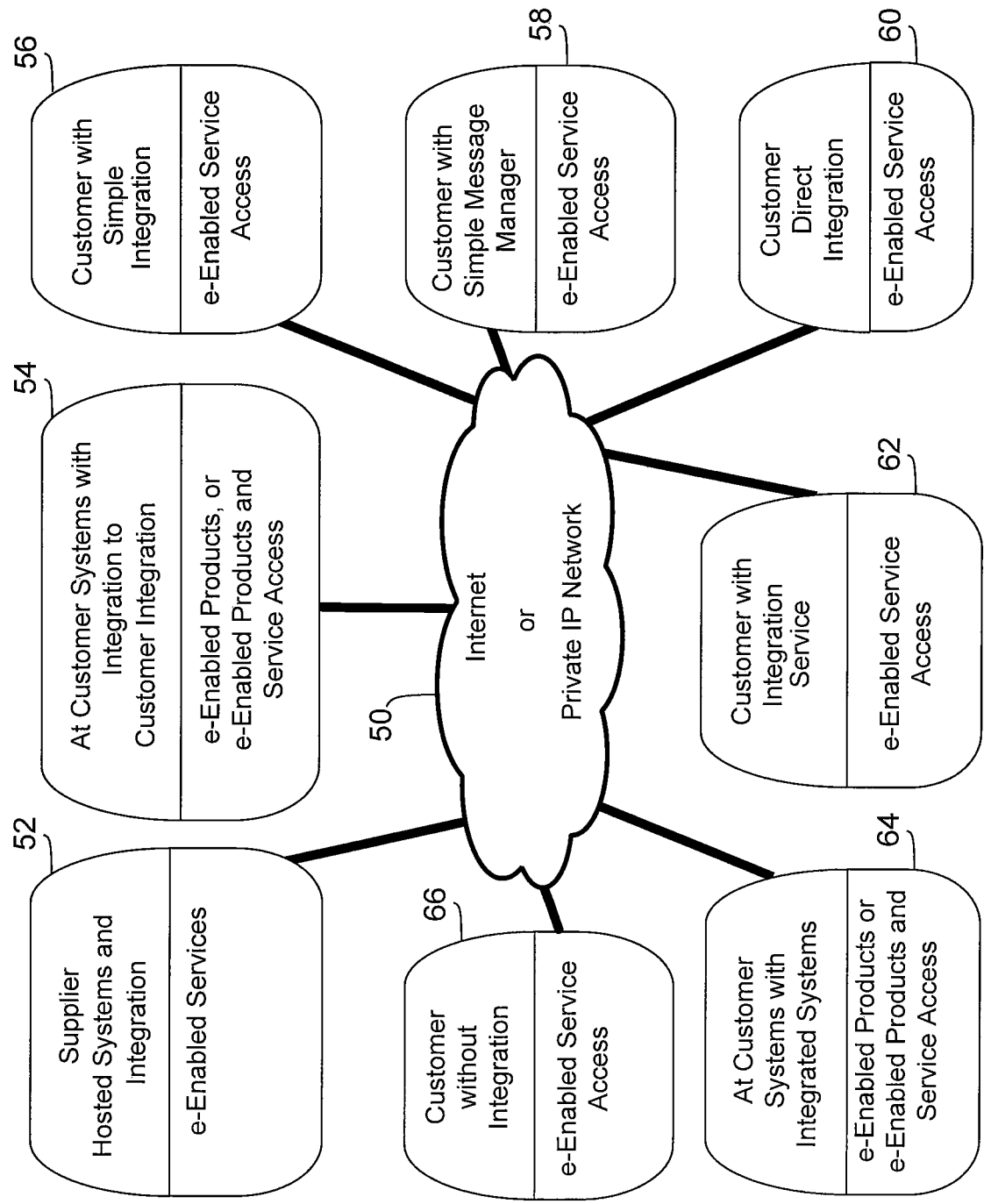
FIG. 3 is an illustration of several ground technical architecture patterns.
Figure 4:
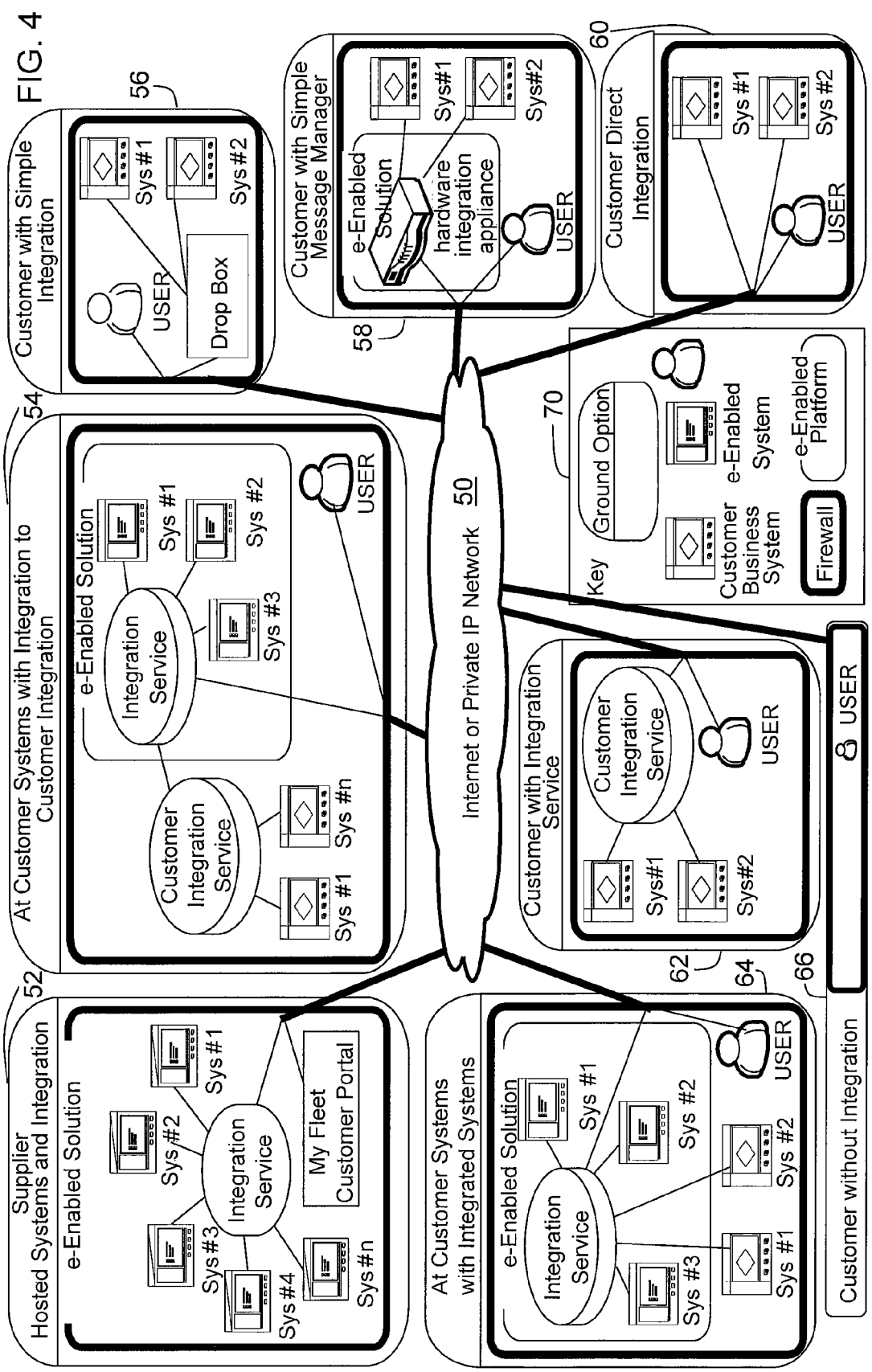
FIG. 4 is an illustration of e-Enabled ground technical view components and functions.

At a highest level, a full set of ground system architecture integration patterns are shown in FIG. 3. Referring specifically to FIG. 3, a plurality of services and products are interconnected through the Internet 50 (or a private IP network). These include supplier hosted services 52, at-customer systems 54, which include one or both of products and services integrated to a customer integration service, and an integration of services 56 to a customer system. Other services and products may include a message manager service 58, a customer direct integration of services 60, services 62 where the customer already utilizes an integration service, and the installation of products or products and services at a customer 64 which are integrated with existing customer systems, and the providing of services to a customer 66 without integrating to any customer systems.

e-Enabled ground technical view components and functions of FIG. 3 are shown in further detail in FIG. 4. FIG. 4 includes a key 70 that illustrates the various components (i.e., platforms, firewalls, customer systems, supplier provided e-Enabled systems, and ground options) that may be utilized to provide information sharing solutions (integration patterns) for customers. The ground technical architecture solution includes all these patterns to provide the widest possible tailorability to meet customer options. The functions of each are described in detail herein.

With regard to e-Enabled ground product models, when e-Enabled systems are provided to customers and deployed within their Intranet, they are products. These products may be administered by the customer, or remotely by the supplier. The supplier provided e-Enabled solution at a customer represents the specification of the complete environment (including hardware, operating system, product versions and alternative options) for the e-Enabled system products.

Figure 5:
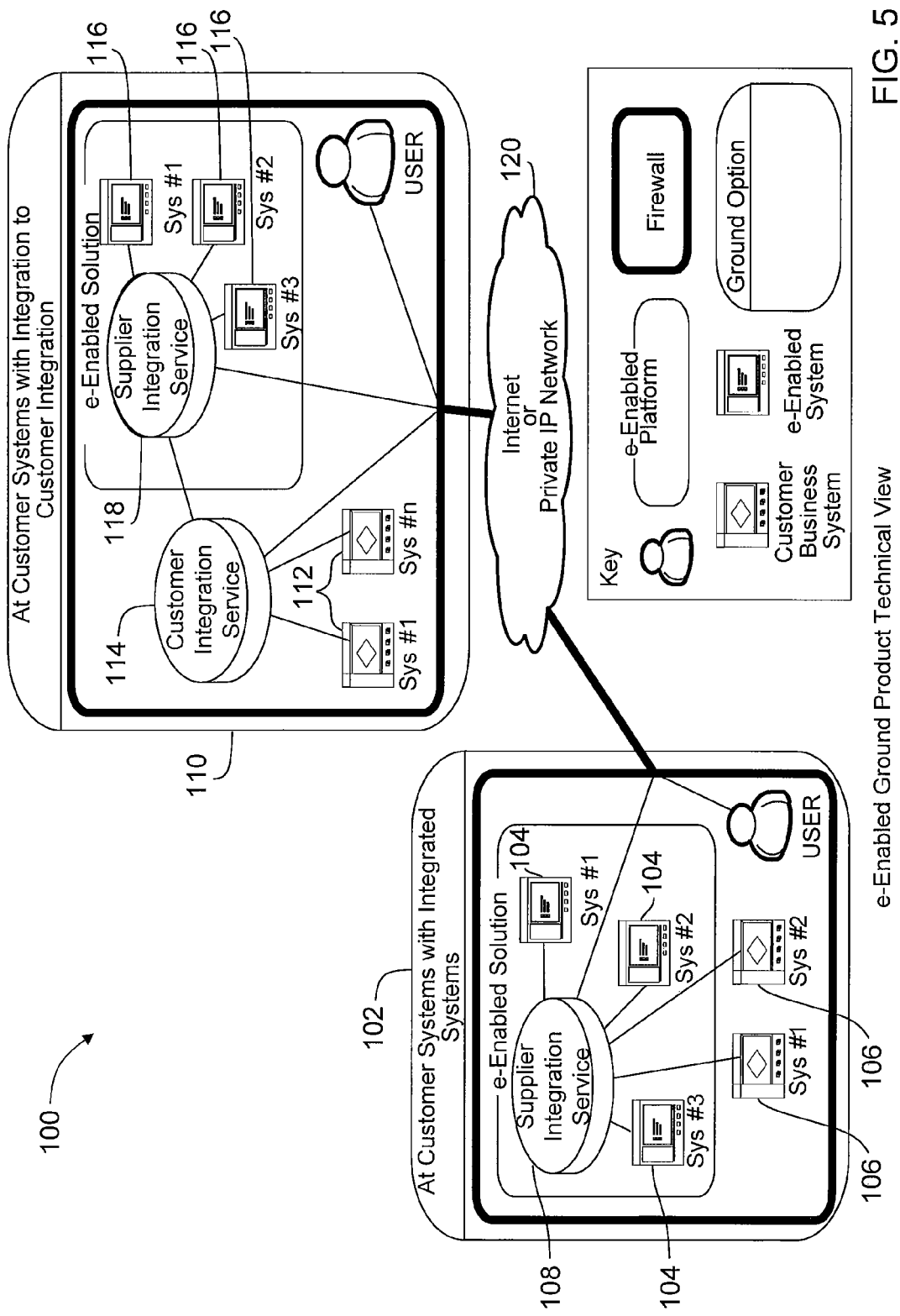
FIG. 5 is an e-Enabled ground product technical view.

Typical, e-Enable product integration patterns include, but are not limited to at-Customer Systems (e.g., systems a customer have in place, either proprietary or provided from a third party) with Integration to Customer Integration Service, and at-Customer with Integrated Systems. Such a product subset of the ground technical view is shown in FIG. 5, which is an e-Enabled ground product technical view 100. As illustrated, there are two high level e-Enabled ground product alternatives, as illustrated in FIG. 5. In the first, shown as 102, e-Enabled systems 104 and customer systems 106 are directly integrated with one another through a supplier integration service 108. In a second alternative, shown as 110, customer systems 112 are integrated through a customer integration service 114 and supplier provided systems 116 are integrated through a supplier integration service 118. The customer integration service 114 is further integrated with supplier integration service 118. In either alternative, e-Enabled systems may be provided to customers as stand-alone product implementations within the customer Intranet 120 (or the Internet), integrated w/ services, and/or integrated w/ customer systems and products.

Figure 6:
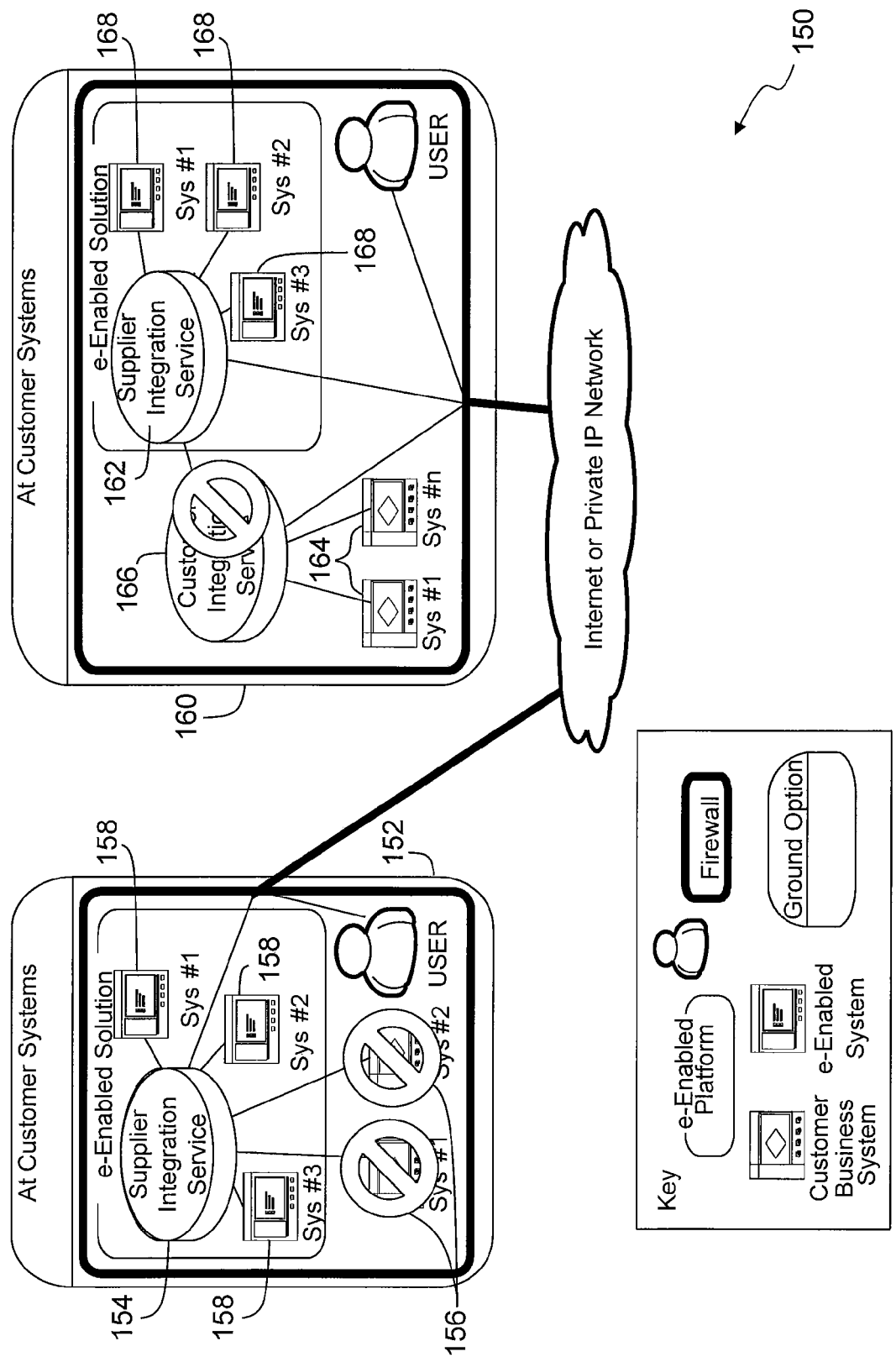
FIG. 6 is an illustration of a stand-alone product pattern of the ground technical view.

FIG. 6 is an illustration of a stand-alone product integration pattern 150. In various embodiments, there are two high level e-Enabled stand-alone alternatives. A first alternative function is where one or more customer products and services do not need to be integrated with each other or with a supplier provided systems and integration services. In this case, shown as 152, supplier integration services 154, at least with respect to customer business systems 156, are not utilized. Supplier provided systems 158 are integrated utilizing supplier integration services 154. In a second alternative function, there are multiple products that are to be integrated with one other. In this case, shown as 160, the supplier integration service 162 does not integrate with non-e-Enabled customer systems 164 which are integrated through a customer integration service 166. Supplier provided systems 168 are integrated utilizing supplier integration services 162

Figure 7:
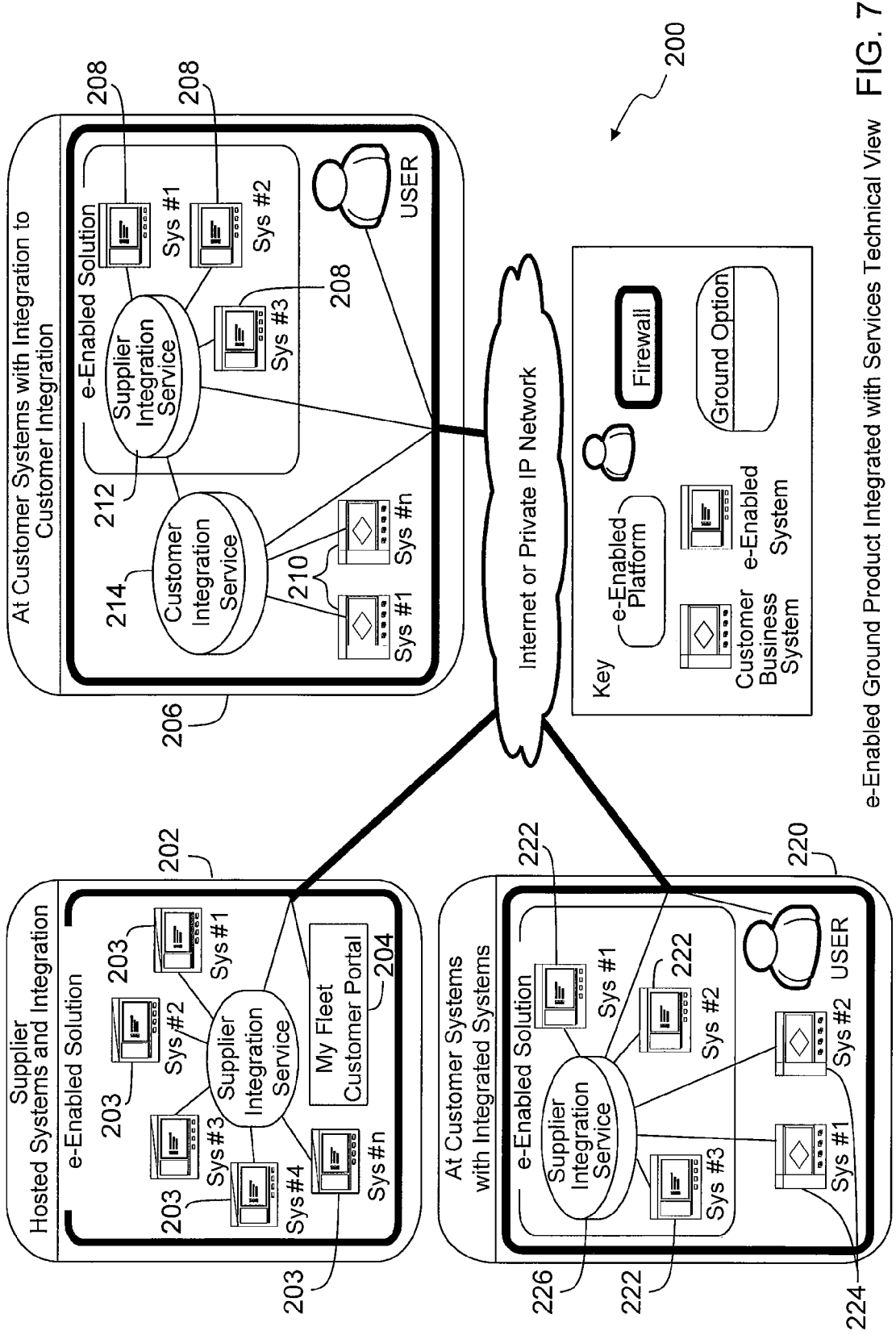
FIG. 7 is an e-Enabled ground product integrated with services technical view.

A product integrated with services integration pattern 200 is shown in FIG. 7, which is an illustration of e-Enabled ground product integrated with services. There are three high-level e-Enabled ground product integrated with services alternatives where multiple e-Enabled products that need to integrate with each other where at least one is at the supplier and at least one is at the customer. The first alternative function, shown as 202, is where the supplier integration service integrates multiple supplier provided systems 203, but no non-e-Enabled customer systems. An additional service 204, referred to herein as "My fleet" services, is shown as being a customer portal within the supplier integration service of function 202. A second alternative, 206, is where at least one e-Enabled system 208 is integrated with non-e-Enabled customer systems 210. The supplier systems 208 are integrated utilizing a supplier integration service 212 and the non-e-Enabled (customer) systems 210 are integrated with a customer integrated service 214. The customer integration service and the supplier integration service are able to share information as needed. A third alternative, 220, is where at least one supplier provided e-Enabled system 222 needs to be integrated with non-e-Enabled customer systems 224 through a customer broker, for example, a supplier integration service 226.

A product integrated with systems (both customer and supplier), rather than services, utilizes the same integration patterns as illustrated in FIG. 7.

With regard to e-Enabled ground service options, the e-Enabled systems may be made available for use from their supplier-hosted locations and may additionally be integrated with customer e-Enabled products as well as customer business COTS and other custom-developed systems. Internet or other communication can be used for access to e-Enabled systems by customers, and integration between supplier and customer systems. The e-Enabled ground service integration patterns include, but are not limited to, integrated supplier-hosted systems, customer with simple integration, customer with simple message manager, customer direct integration, and customer with integration service.

Figure 8:
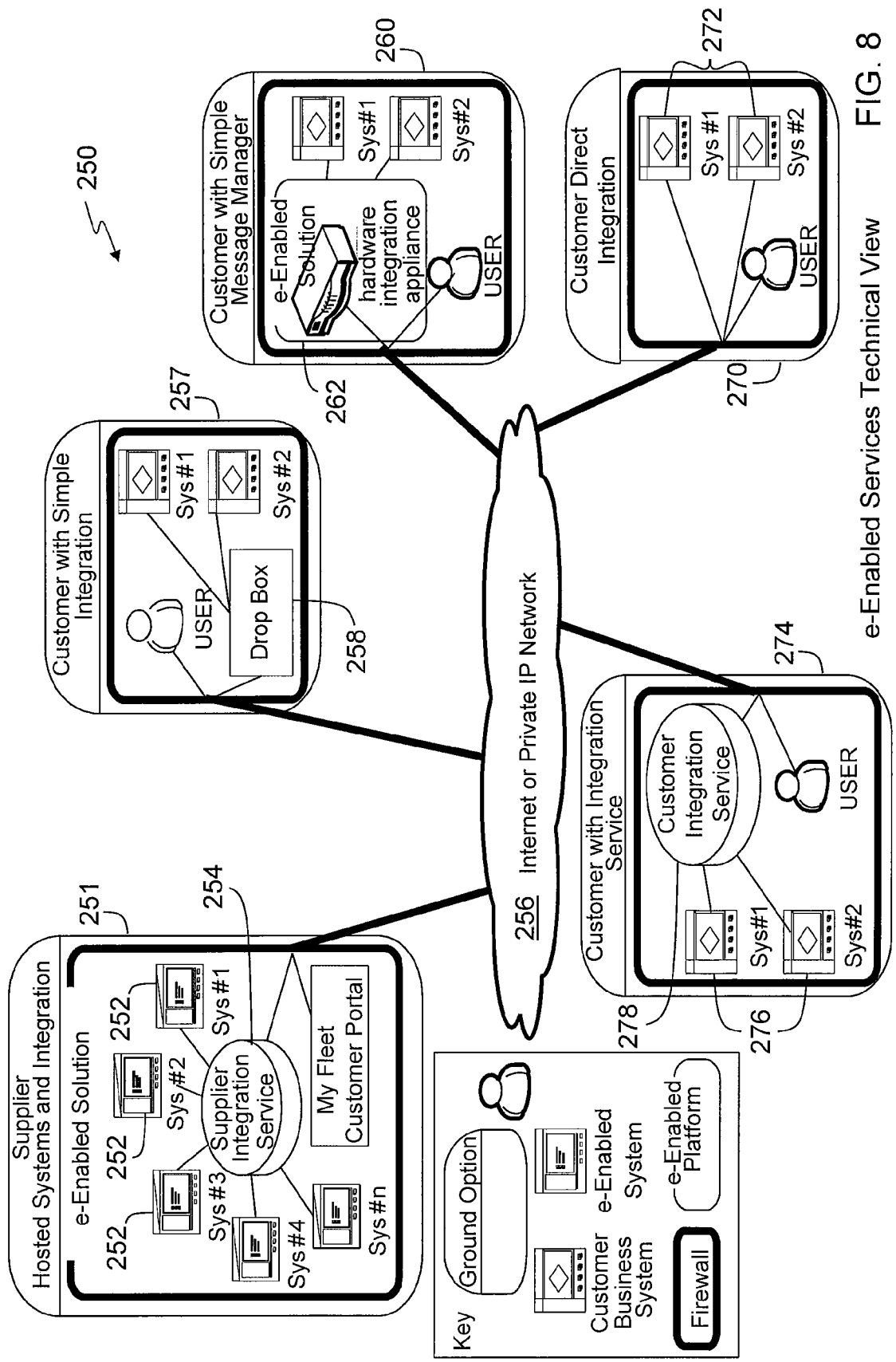
FIG. 8 is an e-Enabled services technical view.

The services subset of the ground technical view is shown in FIG. 8, which is an e-Enabled services technical view 250. In one example function, supplier hosted systems 252 through integration services 254 communicate with other network systems utilizing the Internet 256 (or a private IP network). Also included are a customer function 257 incorporating a drop box 258, a customer function 260 incorporating a hardware integration appliance 262 for multiple customer systems, a customer function 270 that includes directly integrated customer systems 272, and a customer function 274 where customer systems 276 are integrated utilizing a customer integration service 278.

Figure 9:
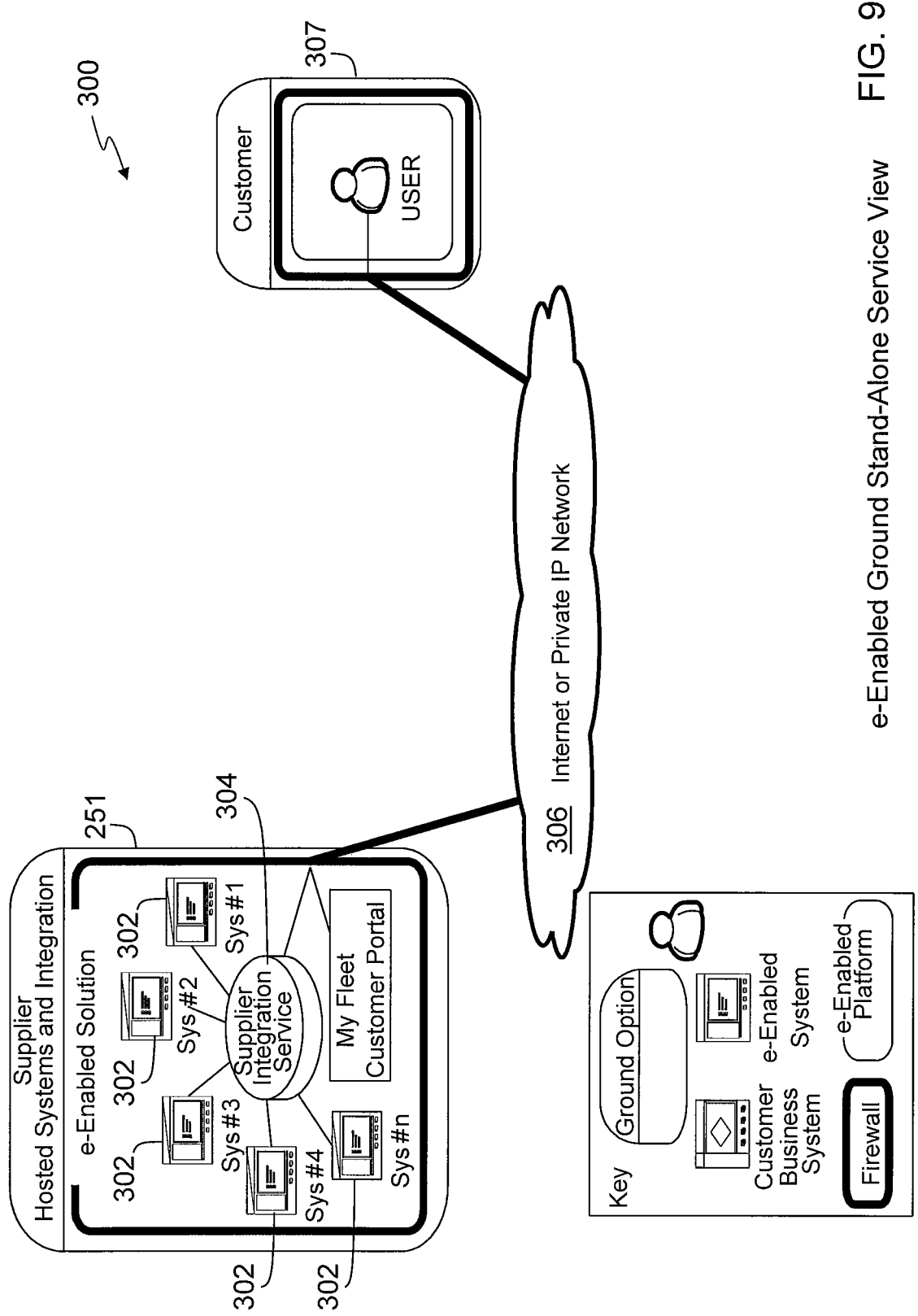
FIG. 9 is an e-Enabled ground stand-alone service view.

Stand-alone services, represented as a supplier hosted systems and integration pattern 300 in FIG. 9, involves customer users 307, without any integration from customer systems to supplier hosted systems, accessing e-Enabled systems 302, via supplier integration service 304, using the Internet 306 or other network supporting Internet Protocol, and having access through a supplier firewall 310. The function provided by the configuration of FIG. 9 may sometimes be referred to as an e-Enabled ground stand-alone service view.

A service integrated with products integration pattern is the same as the product integrated with services integration pattern (FIG. 7, e-Enabled ground product integrated with services), and is not further illustrated. Similarly, the service integrated with systems integration pattern, in a ground technical view, represents the full set of the service integration option, which is the same as illustrated in FIG. 8, the e-Enabled services technical view, as described above.

As currently contemplated, there are four high-level e-Enabled service integrated with systems alternatives. A first alternative is one or more e-Enabled services that do not need to integrate with each other. In this case the supplier integration service is not needed. This is depicted by the supplier-hosted systems and integration pattern without the supplier integration service.

Another alternative is where multiple e-Enabled services need to integrate with each other. In this case the supplier integration service does not need to integrate with non-e-Enabled customer systems. This alternative is depicted by the supplier-hosted systems and integration pattern.

A third alternative is where there are one or more e-Enabled services that need to directly integrate with non-e-Enabled customer systems. This is depicted by the Customer Direct Integration pattern and there is no data translation data translation or queuing.

A fourth alternative is where one or more services need to indirectly integrate with non-e-Enabled customer systems. For example, if the customer-specified indirect integration uses a data drop-box, this is depicted by the at customer simple integration pattern. Again, no data translation or queuing is provided. However, if the customer-specified indirect integration requires an integration service that the customer does not already have then a supplier-deployed hardware integration appliance may be used, as depicted by the at customer simple message manager integration pattern, which provides limited support for data translation and queuing. Further, if the customer-specified indirect integration requires use of an existing customer integration service, this is depicted by the "customer w/ broker" integration pattern, which provides sophisticated support for data translation, queuing, etc.

The e-Enabled systems in all of the above described technical views are composed of one or more technical common services as described below. Common services provide a foundation for systems to share common data, functions and business processes to create integrated, end-to-end customer solutions. Examples of common services include, but are not limited to, data services (databases, backup, and archival), and container services (Web Server: A software server process running at a web site that sends out web pages in response to HTTP requests from remote browsers; Application Server: A software server that supports the web server and provides a tie between web-based business logic and the web server; and Java Virtual Machine (JVM): A standardized consistent run-time environment for binary code to execute, regardless of the operating system).

Common, ground-based e-Enabled services, from a systems view, provide for efficient, reliable and tailorable end-to-end solutions by only creating the business capability once, designing in specified tailored variability, and leveraging improvements across all affected areas that are utilize e-Enabled systems. A common task-based interface replaces existing system interfaces with different look-and-feel to provide a user with a single solution. Common data access services can standardize use of data by multiple e-Enabled systems. By spending more time and resources to sustain common services they become the most reliable components of e-Enabled solutions (just as in manufacturing engineering where tooling design is an order of magnitude more precise as the parts being machined).

Common services provide a foundation for systems to share common data, functions and business processes to create integrated, end-to-end customer solutions. These services are: Application interfaces (which is the user interface to one or more e-Enabled systems, and applications within one or more e-Enabled systems); Local services (which are business capabilities used by only one e-Enabled system); System-wide services (which are business capabilities used, or candidates to be used, by multiple e-Enabled systems); Low-level services (such as operating systems); and Network and Computing Infrastructure services (which are the physical network devices (e.g. routers) and services (e.g. internet-working)).

Other common services include security services, where, for example, supplier access management offers a level of information assurance for web-based applications developed by the supplier that are targeted for deployment in domains outside the supplier network, such as third-party hosting facilities, airlines, or suppliers. The various embodiments described herein loosely couple ground-based systems into a centralized authentication, authorization, and audit mechanism. In addition, the system facilitates identity and access administration and enables single sign-on between systems within a domain, as well as cross-domain federated authentication. Another security service is a digital signature service. The digital signature service is an approach for centralizing the function of non-repudiation and data integrity. The service has signature creation and verification capabilities.

An encryption security service is an approach for centralizing the function of confidentiality. It provides a method for encrypting and decrypting certain types of data. A certificate authority security service is a standard means to issue and manage trusted certificates within the various domains, such as airline and supplier, for use with supplier products and systems. An example of such a certificate is a x.509 certificate.

Other common services include resource management services, which further includes resource management, and software license management. With regard to resource management, products installed at airlines on the at-customer platform will have a common set of remote capabilities to manage, monitor, and support the systems and underlying components. This capability would be configurable at installation to support customers' varying network security policies and implementations.

Software license management is a combination of business processes, business agreements and contracts and technology to manage, track, and audit software licenses associated with software developed, embedded, or resold as a part of supplier product solutions sold to customers or deployed as supplier-hosted services. This includes functions such as general license management, which includes the capture and storage of specific details around embedded or reseller agreements, customer license agreements, individual license data, and so forth. In addition, it provides the ability to track which customer has what software and proactively manage software license updates across the customer base. This reduces over-licensing and under-licensing and provides the ability to recover unused licenses and eliminate obsolete contracts. It facilitates management and reporting associated with embedded and reseller obligations to third-party software providers.

Yet another common service includes Extract/Transform/Load (ETL) services, an example of which is data transfer. The data transfer service defines and provides a common service for business operations data files to be sent to and from the supplier, its customers, or suppliers through a programmatic and an interactive interface. Synchronization is another ETL service that allows multiple copies of data to exist and be kept up to date. One of the copies can be the master with which the others are synchronized. The master can be reallocated to another copy of the data. Also, more than one copy can be a master in which case all copies (including the masters) are synchronized with all masters.

A fleet configuration service defines the customer's fleet or an MRO's view of a fleet that is shared across all products. This is an authoritative source defining who owns and operates each airplane. A software loading service is a common configuration management mechanism for loading software to airplanes during manufacture and while in service. A notification service is a common service for systems to provide an alert to people through various methods such as e-mail, wireless device, pager, and so forth. The notification service manages the device types and notification desired by individuals being notified and handles acceptance of notification and escalation of notifications if required.

A link service provides loosely coupled links resources (URLs) to documents and web pages external to a system which allows different products to be installed into the system for different customers and supports high availability requirements. Portal services provide the e-Enabled systems with a common set of guidelines and services to create a level of integration on the front end of e-Enabled systems. These portal services include client services, process workflow, and user interface services.

Client services provide a level of consistency for end user access by defining COTS browsers and plug-ins that manage presentation of systems. Process workflow supports complex business processes flows by providing the user with the ability to navigate a process that spans multiple systems. User interface services define standards and guidelines for systems to follow for their implementations.

Figure 10:
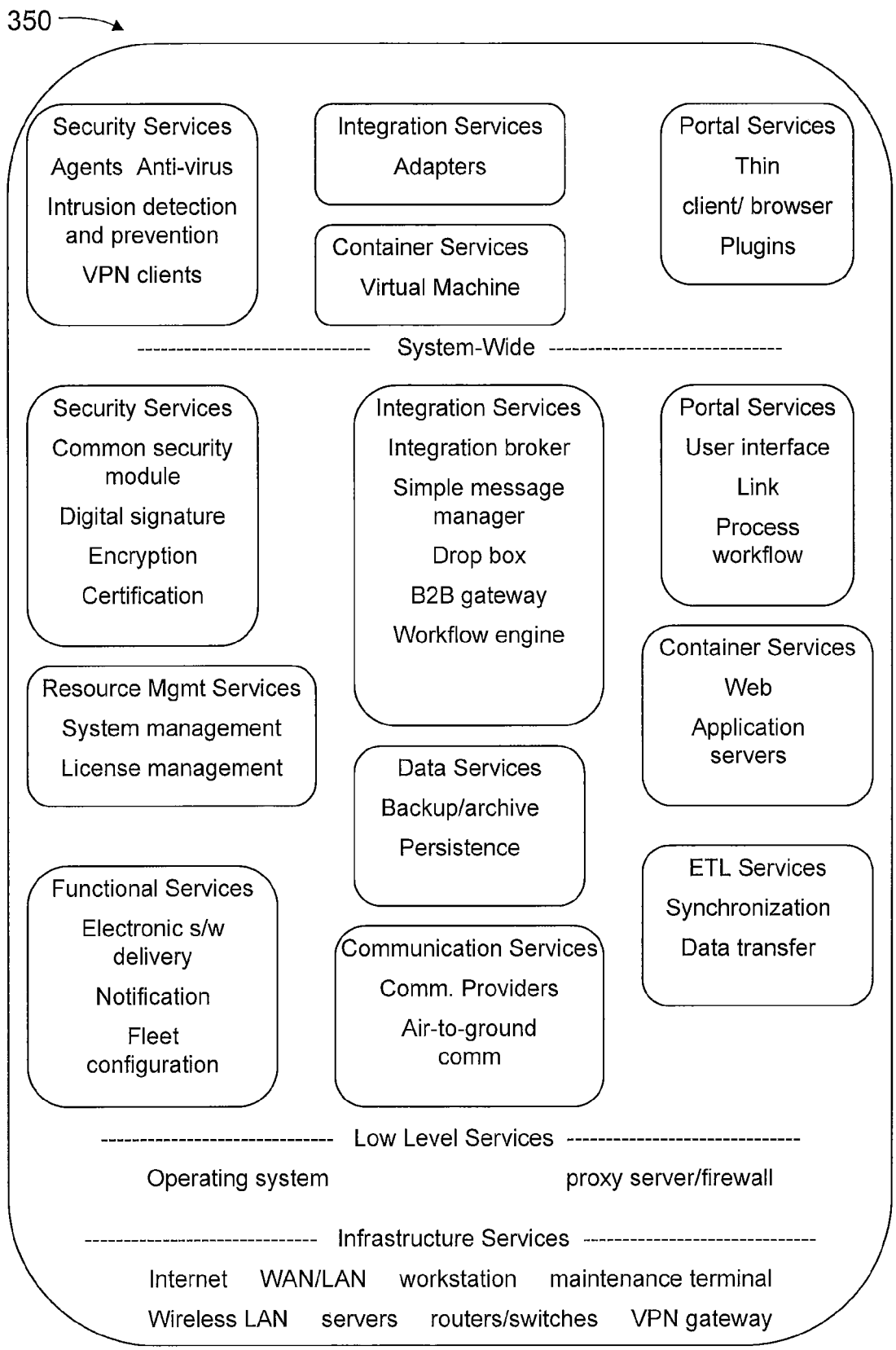
FIG. 10 is an e-Enabled ground common services organization.

All of the above described services can be arranged and further decomposed to create an organization similar to the organization shown in FIG. 10, which is an example of an e-Enabled ground common services organization 350. Technical common integration services are the focal point to connect supplier e-Enabled systems to each other and to customer systems. Integration services provide the ability for systems to exchange data and transactions without the knowledge of each other. The integration services enable systems and services to be loosely coupled to each other and allows third-party and customer systems to be substituted for supplier systems, as required by different implementations for different customer requirements.

Information workflow is contained in the integration services layer. It defines and provides a common service to manage and coordinate the data and message interaction when systems are exchanging data. Integration services are utilized to interact with the functional services and supports high availability of systems and services by abstracting their locations. Abstracting allows systems and services to be dynamically moved in order to support maintenance or unplanned events.

As contemplated, the components of the integration services, include, but are not limited to, an Integration Broker, a Service Registry, a B2B Gateway, an Integration Service API, Simple Message Manager, and a Drop Box Server. In various embodiments, the Integration Broker provides protocol, message translation, and information workflow for application-to-application integration, and the Service Registry contains the list of services—functional or system—that are available through the integration broker. Essentially it is a phonebook of services. The B2B Gateway, in an embodiment, is the function of integration services used for system-to-system interaction across firewalls.

The Integration Service API provides systems and systems with a consistent abstraction layer, allowing the integration broker to be optional in different customer configurations. This allows systems to invoke the common functional services using the same code base in either configuration. The Simple Message Manager is a capability that provides simple asynchronous message integration between systems and/or businesses. It also provides message translation and protocol translation. The Drop Box Service is a capability to provide batch file transfer interchange in a business-to-business environment. It also can be used between systems.

Figure 11:
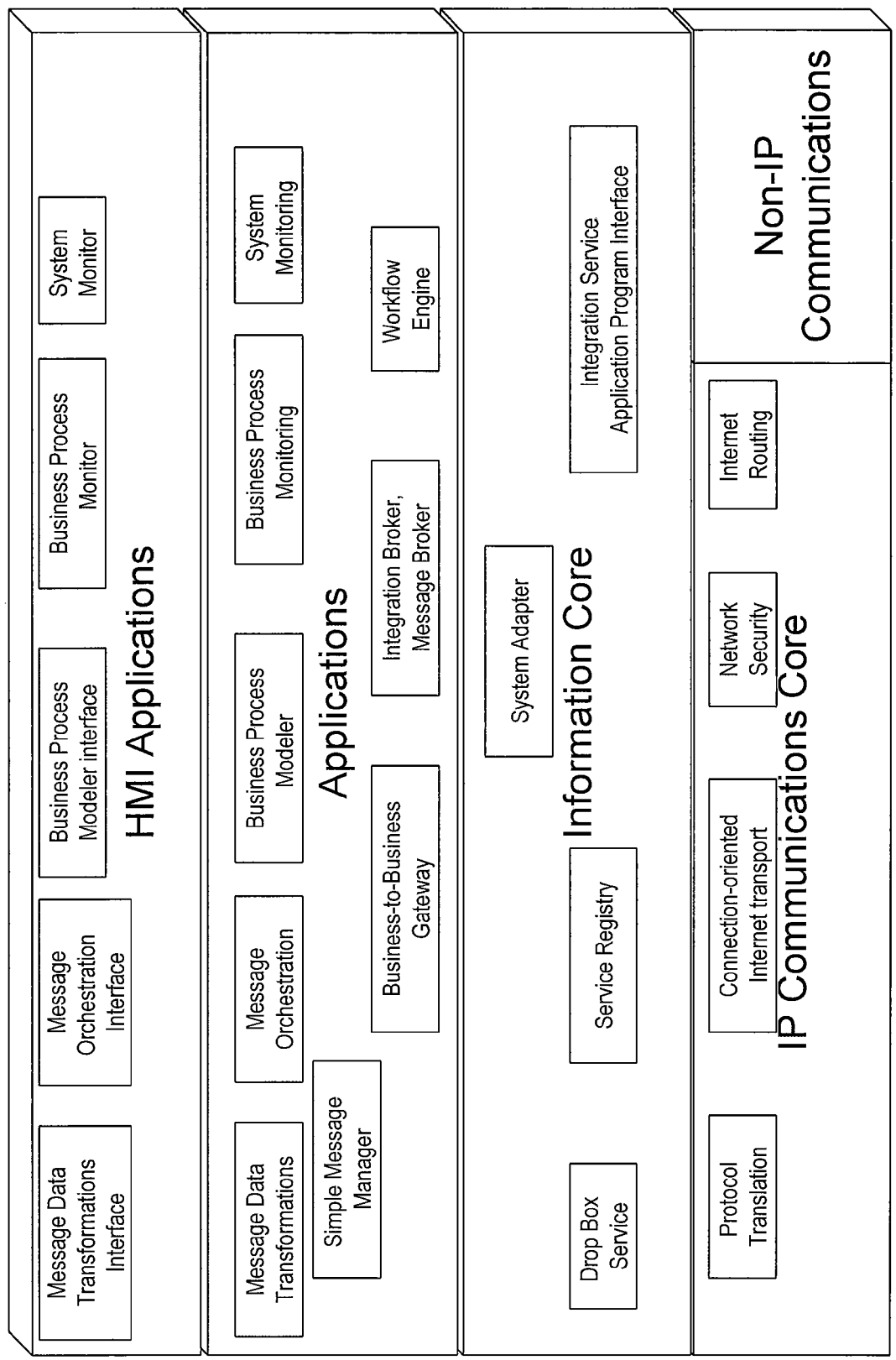
FIG. 11 is an illustration of a strategic architecture reference model.

FIG. 11 is an illustration of a strategic architecture reference model (SARM) 400 that provides a common language to specify solution architectures in a layered representation. SARM is one embodiment of a supplier-sponsored guide to developing platform products which serve as nodes within a larger network. SARM enables integration via standard commercial foundations (IP, HTTP, Web browsing, e-mail, etc.) and enables interoperable communications with commercial techniques.

Figure 12:
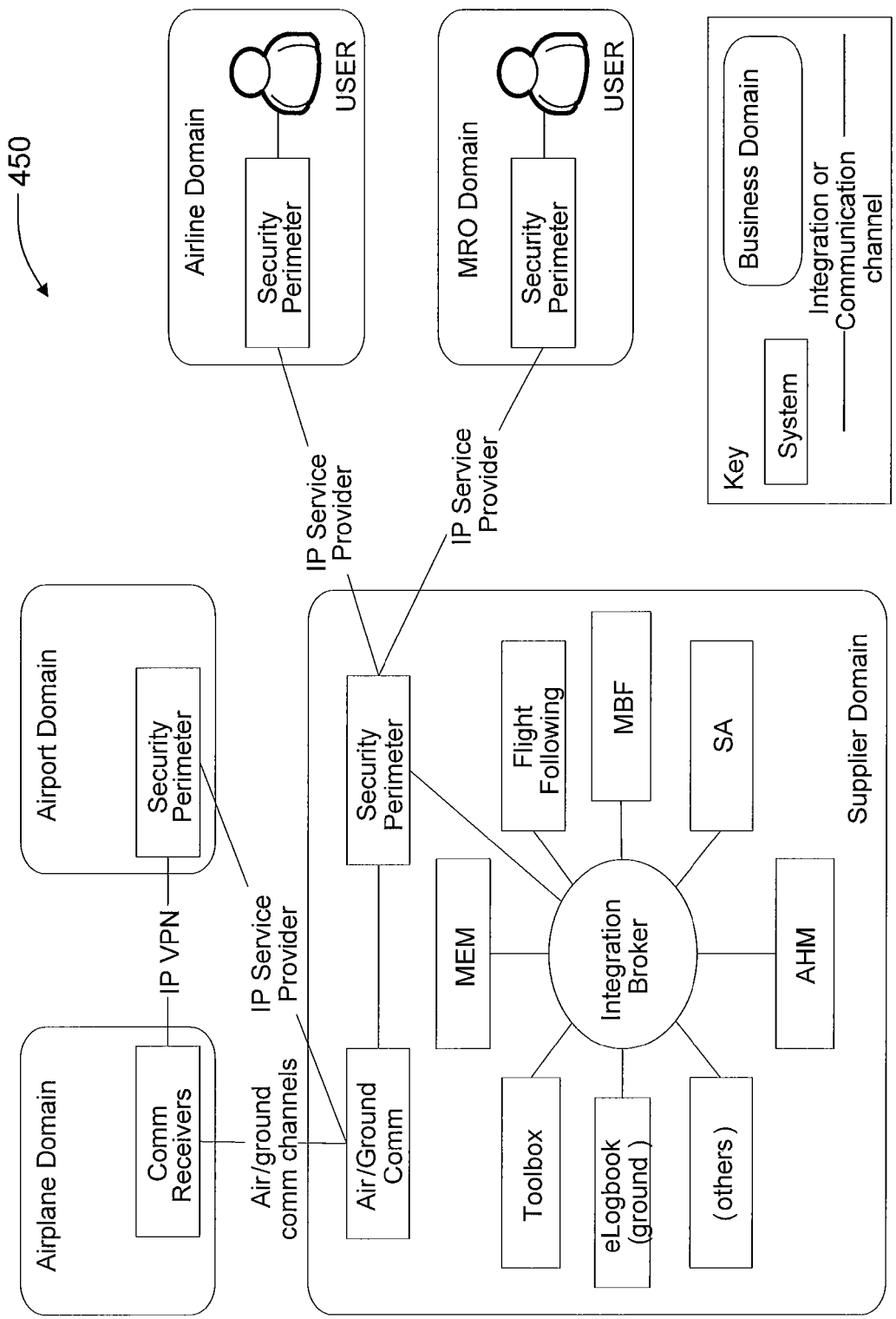
FIG. 12 is a block diagram of a first example e-Enabled ground architecture.
Figure 13:
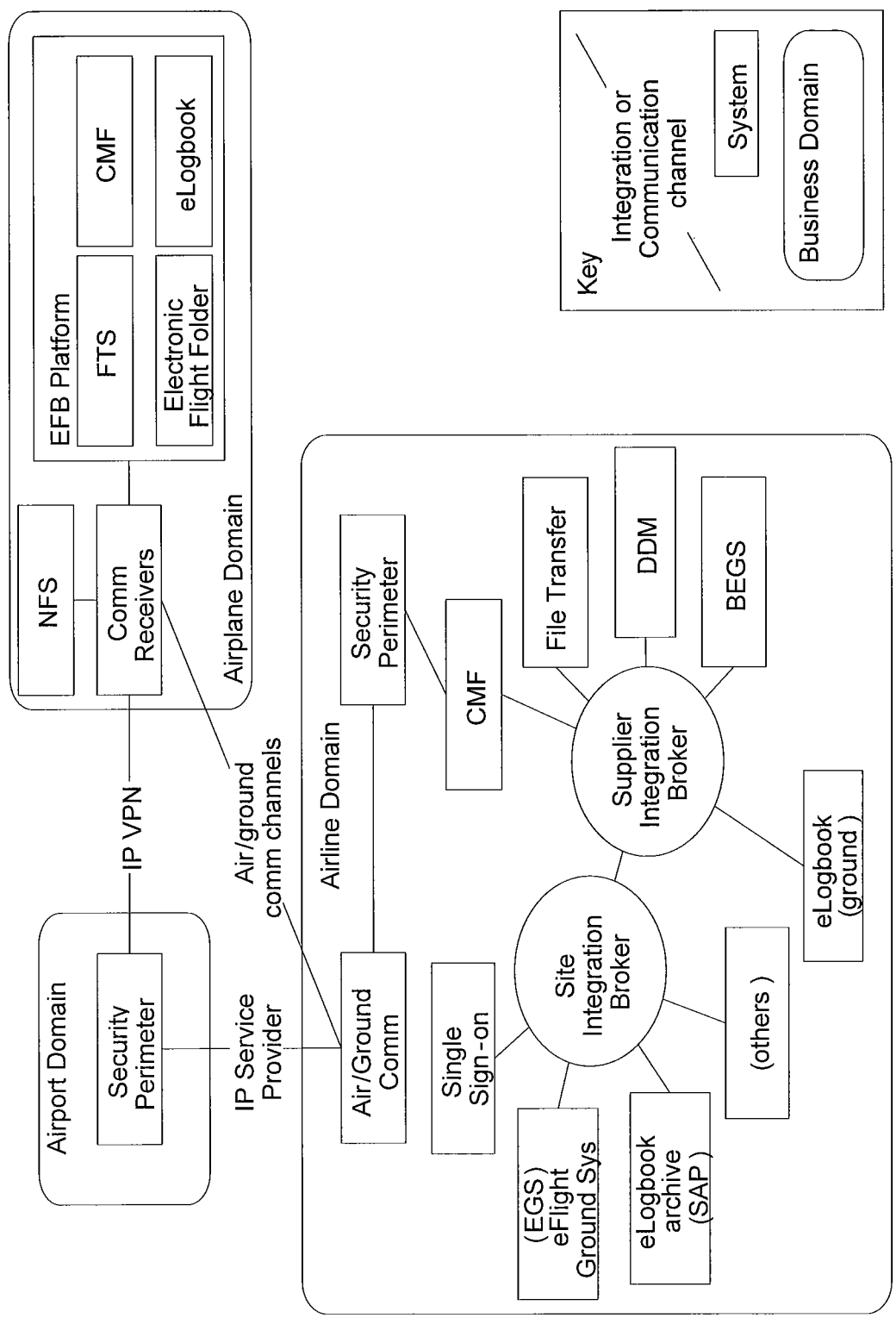
FIG. 13 is a block diagram of a second example e-Enabled ground architecture.

Example mappings of architecture embodiments to provide representative e-Enabled system developments are provided in FIGS. 12 and 13. Technology and product choices are also identified. The intent is to provide a set of architectures and mappings that allow business unit architects to understand the architecture variations from an implementation point of view that is more physical. For example, the ground architecture components can be configured into a set of implementations to support differing customer requirements for hosting, performance, and business models.

One or more of the domains of airline, airport, regulatory authorities, and MROs, may benefit from the herein described e-Enabled integration opportunities. As an example, these domains may include, but are not limited to, airline-flight operations, airport operations, MROs, and other airplane maintenance operations. With regard to airline-flight operations, aircraft scheduling, distance flight training, an integrated airline operations center, an integrated airline station operations center, and maintenance operations are all aircraft related operations that are improved through the herein described e-Enabling processes.

An integrated airline operations center, includes, for example, fuel tracking, crew scheduling, message off-load, flight planning, flight following, maintenance operation coordination, station operation coordination, situation awareness, disruption prevention and recovery, and weather. An integrated airline station operations center includes, for example, situation awareness, check-in, gate solutions, baggage solutions, equipment solutions, staff solutions, disruption prevention and recovery. Airline—maintenance operations includes, for example, line, base, and component maintenance planning and execution, integrated materials management, logbook (electronic), situation awareness, airplane health management, maintenance planning tools, airplane design information, disruption prevention and recovery, and maintenance facilities modeling and simulation.

With regard to the airport operation, including, for example, flights, passengers and facilities modeling and simulation, wireless infrastructure design and deployment, an integrated airport operations center utilizing an e-Enabled architecture provides improved efficiency for tenants and travelers. Such an architecture includes capabilities for providing situation awareness, disruption prevention, and recovery, and flight following. Furthermore, information relating to all arriving flights and weather are functions where information sharing through such an architecture also provides improved efficiency for users.

FIG. 12 is a block diagram of one embodiment of a ground-based architecture 450 that is supplier-hosted. In architecture 450, an airplane maintenance outsourcing service provided to airlines is shown. In architecture 450, a global network of MROs is relied upon to perform maintenance, relying on common systems that are supplier-hosted.

FIG. 13 is a block diagram of one embodiment of a product e-Enabled architecture deployment 550 where the systems are located at a customer site. In deployment 550, systems are located at a customer (e.g., airline's) site, integrated together, and further integrated with systems of the airline through the airline's integration broker.

As described above, a ground architecture includes an infrastructure to support and host supplier e-Enabled systems, provide structure and framework to integrate those systems, and connect the e-Enabled systems with other systems across the e-Enabled ground business domains. Additionally, an e-Enabled ground architecture provides a set of IT infrastructure, and common, reusable services to enable different options to be configured for different customer needs. The underlying IT architecture enables the systems to provide cost-effective solutions and flexibility (tailorablity) in such an environment.

In a ground-based system integration services embodiment, integration of independent systems is accomplished by a loose coupling that allows data sharing across a network, an Intranet, or the Internet. This coupling between systems provides capabilities that allow systems to share information and be anywhere on a network, on different networks within the same company or different companies, or even on airplanes.

With regard to runtime functions, system adapters provide for internal data to be formatted into standard message definitions for publication, and for received messages to be digested by the system. A message broker receives all published messages from all systems, may transform internal data within messages, maintains a subscription list for each message, and resends the original published message to each subscriber. The Business to Business (B2B) Gateway provides navigation to other companies' networks, usually involving firewall navigation. A Business process engineering workflow engine enforces business rules of which messages are prerequisites for other messages, and may act as workflow manager gathering information from independent systems to perform business tasks that no single system can.

With regard to operational functions, when the middleware is running it must be monitored and administrated to insure that crucial data and process are being executed efficiently. The system monitor provides situational awareness of systems, the message transport, the B2B gateway, and the integration broker including status, volume, and guaranteed delivery. If the work flow engine function is used then the business process monitor provides situation awareness of the workflow engine including exception handling, process volumes, and other aspects.

In development functions, the message data transformation function represents the means to specify changes required to data within a specific message definition. These can include changing information within a message, creating a new message with data from the original message or a combination of the two. Transformations can be generic for all instance of a message definition, or can be subscriber-specific. A message orchestration function specifies the required prerequisite message or messages for a message to be meaningful, and the actions to be taken when a prerequisite is not met. A business process engineering modeler function is used to specify message interactions with systems and processing required to enable end-to-end business scenarios/processes. The above described ground architecture system view illustrates operational components, showing their connectivity, domains and relationships.

While the invention has been described in terms of various specific embodiments, those skilled in the art will recognize that the invention can be practiced with modification within the spirit and scope of the claims.

What is claimed is:

1. A method for distributing airplane operation related services information provided by ground-based systems among such systems, said method comprising:
   receiving, at a central computer system, information relating to airplane operation from a plurality of airplane service functions, via a plurality of computer systems associated with the airplane service functions, the airplane service functions including two or more of airlines, airplanes, airports, regulatory authorities, maintenance repair organizations, suppliers, and aircraft manufacturers;
   providing at least one common service to the airplane service functions, the common service including at least one of a data service and a container service;
   providing a common interface to the airplane service functions, the common interface configured to display the received airplane operation information;
   determining, using a program running in the central computer system, which of the received airplane operation information is applicable to each of the airplane service functions; and
   distributing, from the central computer system through the common interface, the applicable airplane operation information to each of the airplane service functions to which the information is applicable, the information received via the plurality of computer systems associated with the airplane service functions for display on the common interface.

2. A method according to claim 1 further comprising at least one of integrating at least a portion of the computer systems providing the airplane operation information at a supplier-hosted location such that the information may be provided to the central computer system and integrating at least a portion of the computer systems providing the airplane operation information at a customer location such that the information may be provided to the central computer system.

3. A method according to claim 1 wherein determining which of the received airplane operation information is applicable to each of the airplane service functions comprises identifying tailored options and reusable components therein which can be utilized to meet customer needs.

4. A method according to claim 1 wherein receiving information from a plurality of airplane service functions comprises utilizing integration patterns to enable customer systems, firewalls, and supplier provided systems to interoperate with each other.

5. A method according to claim 4 wherein utilizing integration patterns comprises providing a service offering to the customer by the supplier.

6. A method according to claim 1 further comprising providing a system for providing the information relating to airplane operation and receiving the distribution of applicable airplane operation information.

7. A method according to claim 5 wherein providing a service offering to the customer by the supplier comprises an integration with one or more customer systems.

8. A method according to claim 7 wherein an integration with one or more customer systems comprises direct point-to-point integration between supplier provided systems and one or more customer systems.

* * * * *